United States Patent
Levy

(10) Patent No.: US 9,471,523 B2
(45) Date of Patent: Oct. 18, 2016

(54) SERIAL INTERFACE SYSTEMS AND METHODS HAVING MULTIPLE MODES OF SERIAL COMMUNICATION

(71) Applicant: Infineon Technologies AG, Neubiberg (DE)

(72) Inventor: David Levy, Wernberg (DE)

(73) Assignee: Infineon Technologies AG, Neubiberg (DE)

( * ) Notice: Subject to any disclaimer, the term of this patent is extended or adjusted under 35 U.S.C. 154(b) by 500 days.

(21) Appl. No.: 14/029,857

(22) Filed: Sep. 18, 2013

(65) Prior Publication Data

US 2015/0081940 A1    Mar. 19, 2015

(51) Int. Cl.
*G06F 13/00* (2006.01)
*G06F 13/364* (2006.01)
*G06F 13/42* (2006.01)

(52) U.S. Cl.
CPC ......... *G06F 13/364* (2013.01); *G06F 13/4291* (2013.01)

(58) Field of Classification Search
USPC ................................. 710/104–110, 306–317
See application file for complete search history.

(56) References Cited

U.S. PATENT DOCUMENTS

| | | | |
|---|---|---|---|
| 6,496,487 B2 | 12/2002 | Franz et al. | |
| 7,467,240 B2 * | 12/2008 | Low | G06F 13/4291 710/33 |
| 7,949,802 B2 * | 5/2011 | Gallant | G06F 13/4081 710/300 |
| 8,751,709 B2 * | 6/2014 | Ruberg | H04L 29/10 710/313 |
| 8,782,319 B2 * | 7/2014 | Wang | G06F 3/0607 710/306 |
| 2003/0200359 A1 * | 10/2003 | Fernald | G06F 13/4291 710/5 |
| 2010/0223403 A1 * | 9/2010 | Chau | G06K 19/07 710/14 |
| 2013/0021953 A1 | 1/2013 | Yilmazer et al. | |
| 2013/0318289 A1 * | 11/2013 | Tomlin | G06F 3/061 711/103 |

* cited by examiner

*Primary Examiner* — Raymond Phan
(74) *Attorney, Agent, or Firm* — Eschweiler & Associates, LLC

(57) ABSTRACT

An enhanced serial interface system is disclosed. The system includes a master component and a slave component. The master component is configured to operate in a standard mode and an enhanced mode for communication. The master component includes standard terminals and hybrid terminals. Only the standard terminals are used for communicating in the standard mode. The hybrid terminals and the standard terminals are used for communicating in the enhanced mode. The slave component is configured to operate in the enhanced mode and communicate with the master component.

20 Claims, 7 Drawing Sheets

STANDARD MODE

SERIAL INTERFACE SYSTEMS AND METHODS HAVING MULTIPLE MODES OF SERIAL COMMUNICATION

BACKGROUND

Serial interfaces use serial communication protocols to transfer data. Serial interfaces send pieces of information one right after another. In contrast, parallel interfaces send multiple pieces of information simultaneously. In theory, parallel interfaces can send information faster, however they require more lines or wires to transfer the data.

A common serial interface uses only two lines or wires for transferring power and data. Such an interface is used when limited lines or wires are available. For example, automotive systems typically use a two line serial interface for communication. This is due to the typical limited space and wire availability for automotive systems.

However, the common two line serial interface can be too slow for some applications.

DETAILED DESCRIPTION

Figure 1:
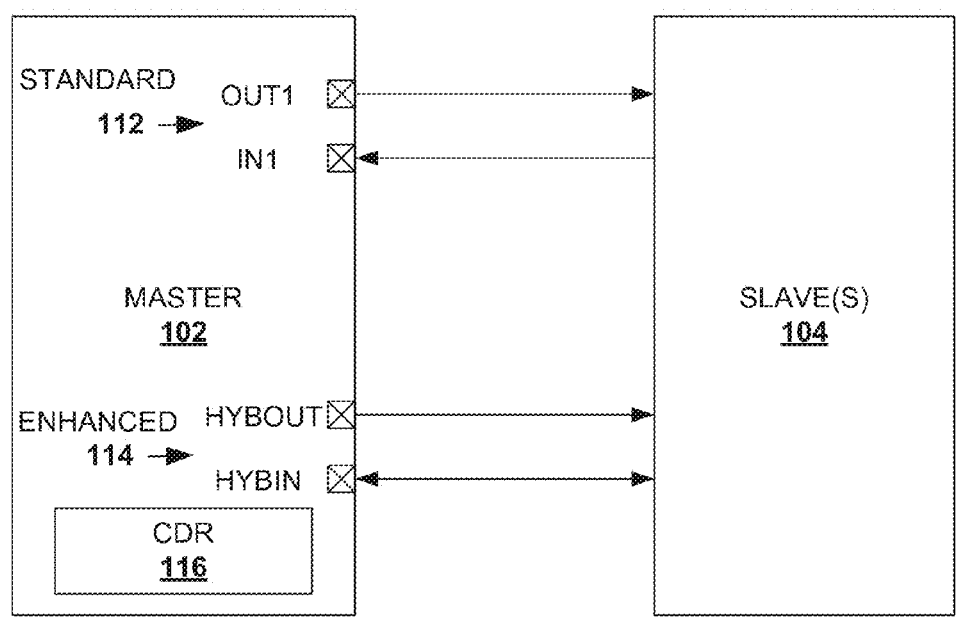
FIG. 1 is a block diagram illustrating an enhanced serial interface system having a higher throughput than other serial communications systems.

The present invention will now be described with reference to the attached drawing figures, wherein like reference numerals are used to refer to like elements throughout, and wherein the illustrated structures and devices are not necessarily drawn to scale.

Systems and methods are disclosed that facilitate serial communications by utilizing terminals and lines for multiple/hybrid purposes. Terminals and corresponding lines for clock and chip select functionality in one mode are utilized for communication in another mode.

FIG. 1 is a block diagram illustrating an enhanced serial interface system 100 having a higher throughput than other serial communications systems. The system 100 utilizes an enhanced mode along with hybrid or enhanced lines to facilitate the throughput and compatibility of the system 100. The system 100 is described in a simplified format to aid understanding.

Serial interfaces, such as a serial peripheral interface (SPI), are used for communicating between devices. The interface is a synchronous serial data link standard that operates in full duplex mode. Devices communicate in master/slave mode where a master component initiates a data frame and selects slave component(s) to communicate with. The slave components include individual chip select lines, used for activating or selecting components for communication with the master component.

The serial peripheral interface is typically implemented as a four wire serial bus and includes four basic lines, master out, master in, clock, and chip select. The serial peripheral interface is also referred to as a synchronous serial interface.

Systems, such as automotive systems, often utilize a serial peripheral interface to communicate between multiple sensors and components. Such systems can have a relatively large number of sensors and components. However, the throughput of conventional systems limits the number of sensors and/or system components that can effectively communicate.

The system 100 facilitates a higher data throughput and permits a greater number of sensors. Further, the system 100 provides backwards capability permitting communication with conventional slave components.

The system 100 includes a master component 102 and one or more slave components 104. The master component 102 communicates with the slave components 104 in either a standard mode providing backwards compatibility or an enhanced mode that increases throughput. Further, the master component 102 can communicate with some of the slave components 104 in the standard mode and others in the enhanced mode.

The slave components 104 can include standard slaves and enhanced slaves. The standard or conventional slave components are operable in only the standard mode. The enhanced slaves are operable in at least the enhanced mode. Thus, the system 100 supports both types of slaves, standard and enhanced.

The master component 102 includes standard terminals 112 and enhanced or hybrid terminals 114. The standard terminals include a first output terminal (OUT1) and a first input terminal (IN1). The output terminal provides a serial master output signal used to transfer data out or from the master component 102 and the input terminal is configured to receive a serial master input signal, which is used to transfer data into the master component 102. Lines couple the terminals to the one or more slave components 104.

The enhanced terminals 114 include a hybrid output terminal (HYBOUT) and a hybrid bidirectional terminal (HYBIN). Generally, a unique hybrid output terminal is provided for each of the slave components 104. The enhanced terminals 114 are used for signals/functions according to the mode of operation. The hybrid output terminal provides a standard chip select signal for the standard mode of operation and a hybrid out/select signal for the enhanced mode of operation. The standard chip select signal selects a chip by asserting a particular value for a duration of the communication of the frame. In one example, the standard chip select signal is provided from the hybrid output terminal by asserting a LOW signal. The hybrid select signal activates the selected slave component by providing a suitable preamble and is followed by a second serial master output signal. Both of the select signals activate the selected sensor component for communication. However, the hybrid select signal additionally operates as the second serial master output signal.

The hybrid bidirectional terminal (HYBIN) provides a synchronous clock for the standard mode of operation and receives a second serial master input signal for the enhanced mode of operation. For the standard mode, the synchronous clock is used by the master component 102 and the selected slave component to perform full duplex communication.

The synchronous clock is at a suitable frequency that can be utilized by the selected slave component and the master clock 102 to communicate.

For the enhanced mode, the hybrid bidirectional terminal receives the second serial master input signal. The clock and data recover component 116 generates a recovered clock from the serial master input signal and/or the second serial master input signal. The recovered clock is used full duplex communication.

The enhanced terminals 114 correspond to the classic SPI terminals SCLK and CSN. The enhanced terminals permit the exchange of data in the enhanced mode without dedicated clock and a chip select lines. However, to a slave component using conventional SPI communication, the hybrid terminals 114 appear as the classic or conventional SPI terminals, SCLK and CSN.

As described above, the system 100 includes the standard and enhanced modes of operation. The standard mode of operation permits backwards compatibility with conventional or standard slave components that only utilize two data lines, one in and one out, for communication, and requires two additional control lines (clock and chip select). The enhanced mode reuses the control lines via the terminals for communication and manages communication without the control lines.

Figure 2A:
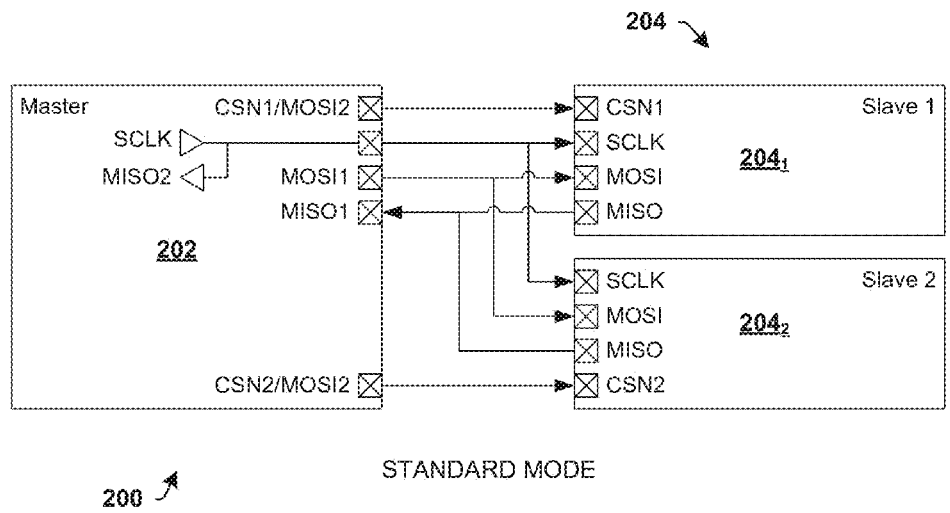
FIG. 2A is a diagram illustrating an enhanced serial system operating in a standard mode.

FIG. 2A is a diagram illustrating an enhanced serial system 200 operating in a standard mode. The system 200 can be utilized as or with the system 100 described above.

The system 200 includes a master component 202 and one or more slave components 204. For illustrative purposes, the slave components 204 are shown with a first slave component $204_1$ and a second slave component $204_2$. However, it is appreciated that any suitable number of slave components can be present in the one or more slave components 204. The slave components $204_1$, $204_2$ and the master component 202 are described operating in the standard mode in this example.

The first slave component $204_1$ includes a first slave chip select (CSN1), a synchronous clock (SCLK), a MOSI, and a MISO terminals. The second slave component $204_2$ includes a second slave chip select (CSN2), a synchronous clock (SCLK), a MOSI, and a MISO terminals. The terminals receive/send signals associated with the terminals.

The master component 202 includes standard communication terminals, MOSI1 and MISO1, and hybrid terminals including a hybrid bidirectional (SCLK/MISO2) and a hybrid out (CSN/MOSI) terminals. The standard terminals provide a first master output signal via the terminal MOSI1 and receive a master input signal via the terminal MISO1. The hybrid terminals, in the standard mode, provide a chip select signal at the hybrid out terminal and provide a synchronous clock (SCLK) at the hybrid bidirectional terminal. Lines connect the terminals between the components as shown in FIG. 2A.

A first standard chip select signal is provided from the hybrid out terminal to the CSN1 terminal of the first slave component $204_1$, which activates the slave component for communication. A second standard chip select signal is provided from a second hybrid out terminal to the CSN2 terminal of the second slave component $204_2$, which is used to activate the second slave component $204_2$ for communication. In one example, the signal is asserted LOW to activate the sensor component and is asserted HIGH to deactivate the associated sensor component.

An synchronous clock signal is provided by the master component 202 for use by the slave components. The clock signal is provided at the hybrid bidirectional terminal and is provided to the MISO terminals of the sensor components 204.

A MOSI signal is generated by the master component 202 and is received at both MOSI terminals of the sensor components $204_1$ and $204_2$. The MOSI signal includes data transferred from the master component 202 to one of the sensors 204. A MISO signal is generated by one of the slave components, the one selected and activated by the chip select signal, and is received at the associated terminal of the master component. The MISO signal includes data from the one of the slave components.

It is noted that the slave components 204 do not need to be aware that the master component 202 is enhanced and/or operates in additional modes. The slave components 204 are able to interact with the master component 202 as if it were a standard master component.

Only standard throughput is obtained, but backwards compatibility is maintained.

Figure 2B:
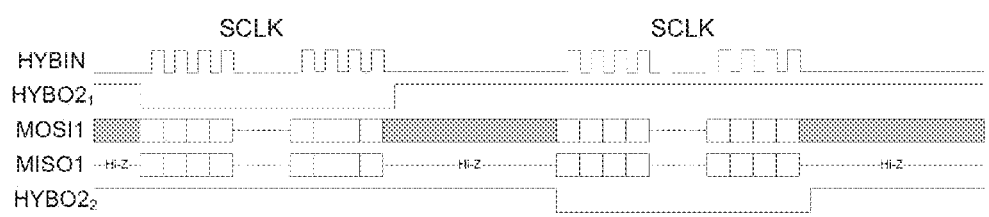
FIG. 2B is a graph depicting an example serial communication using the system 200 in the standard mode.

FIG. 2B is a graph/timing diagram 201 depicting an example serial communication using the system 200 in the standard mode. The graph 201 is provided for illustrative purposes and it is appreciated that variations in the signals and signal levels shown are contemplated.

For a first portion, a hybrid out terminal provides the first standard chip select signal, denoted by $HYBO2_1$, is LOW. This first standard chip select signal activates the first sensor component $204_1$ during the first portion. The clock signal is provided by the hybrid bidirectional terminal and is used by the master component 202 and the sensor component $204_1$ to synchronize full duplex communication using the MISO1 and MOSI1 signals. The MISO terminal is at a high impedance state when none of the sensor components 204 are activated. It is noted that the second standard chip select signal $HYBO2_2$ provided at a second hybrid output terminal is HIGH during the first portion.

For a second portion, the second standard chip select signal $HYBO2_2$ is LOW, which activates the second sensor component $204_2$. The clock signal provided at the hybrid bidirectional terminal of the master component 202 is used for full duplex communication between the master component and the second sensor component $204_2$. It is noted that the first standard chip select signal is HIGH during the second portion.

Figure 3A:
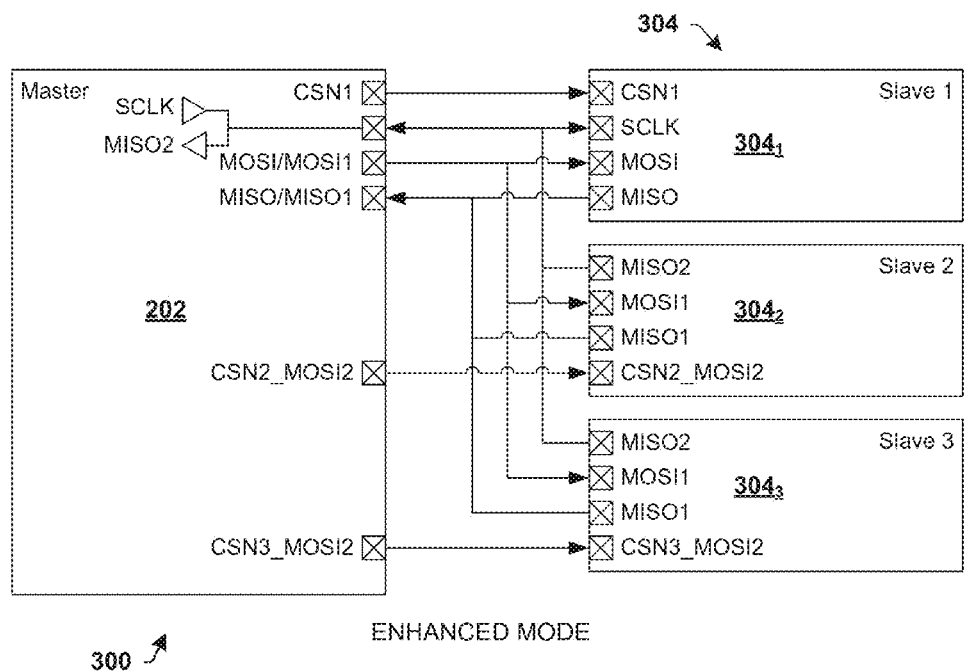
FIG. 3A is a diagram illustrating an enhanced serial system operating in an enhanced mode.

FIG. 3A is a diagram illustrating an enhanced serial system 300 operating in an enhanced mode. The system 300 can be utilized as or with the system 100 described above.

The system 300 includes the master component 202 and one or more slave components 304. For illustrative purposes, the slave components 304 are shown with a first slave component $304_1$ a second slave component $304_2$, and a third slave component $304_3$. However, it is appreciated that any suitable number of slave components can be present in the one or more slave components 304.

The master component 202 is substantially the same as the component 202 described in FIG. 2 and operates in the standard and enhanced modes. However, some of slave components 304 are configured to operate in the enhanced mode.

The slave components $304_2$ and $304_3$ and the master component 202 are operating in the enhanced mode. In the enhanced mode, the hybrid bidirectional terminal is used to select one of the slave components 304 using a chip select preamble and is then utilized to receive a second MISO signal for receiving data from the selected slave component.

The first slave component $304_1$ operates in the standard mode and operates similar to the slave components $204_1$ and $204_2$, described above. The first slave component receives a clock signal from the hybrid bidirectional terminal and is selected by a standard chip select signal. A MISO signal is used for sending data to the master component 302 and a MOSI signal is used for receiving data from the master component 302.

The second slave component $304_2$ includes a hybrid select/data out terminal (CSN2_MOSI2), a first slave input terminal (MOSI1), a first slave output terminal (MISO1), and a second slave output MISO2 terminal. The terminals receive/send signals associated with the terminals. It is noted that there is no terminal shown or needed for receiving a clock in the enhanced mode. The third slave component $304_3$ also includes a hybrid select/data out terminal (CSN2_MOSI2), a first slave input terminal (MOSI1), a first slave output terminal (MISO1), and a second slave output MISO2 terminal. The terminals receive/send signals associated with the terminals.

A first chip select signal, CSN1, is used to activate the first sensor component $304_1$. In this example, CSN1 at LOW activates the sensor component $304_1$ and CSN1 at HIGH deactivates the sensor component $304_1$.

A hybrid/out signal is provided to the second sensor component $304_2$ to select the component for communication and to send data. A preamble portion of the signal identifies and/or activates the second sensor component $304_2$. Subsequently, a second portion of the hybrid/out signal includes a second master out signal and is also provided to the second sensor component $304_2$. Thus, communications between the master component 202 and the second sensor component $304_2$ utilize first and second master input signals and first and second master output signals.

Similarly, another hybrid/out signal is provided to the third sensor component $304_3$ to select the component for communication and to send data. A preamble portion of the signal identifies and/or activates the second sensor component $304_3$. Subsequently, a second master out signal is provided to the second sensor component $304_3$. Thus, communications between the master component 202 and the second sensor component $304_3$ utilize first and second master input signals and first and second master output signals.

Thus, the system 300 shows an example of using slave components operable in either the standard mode or the enhanced mode of operation.

Figure 3B:
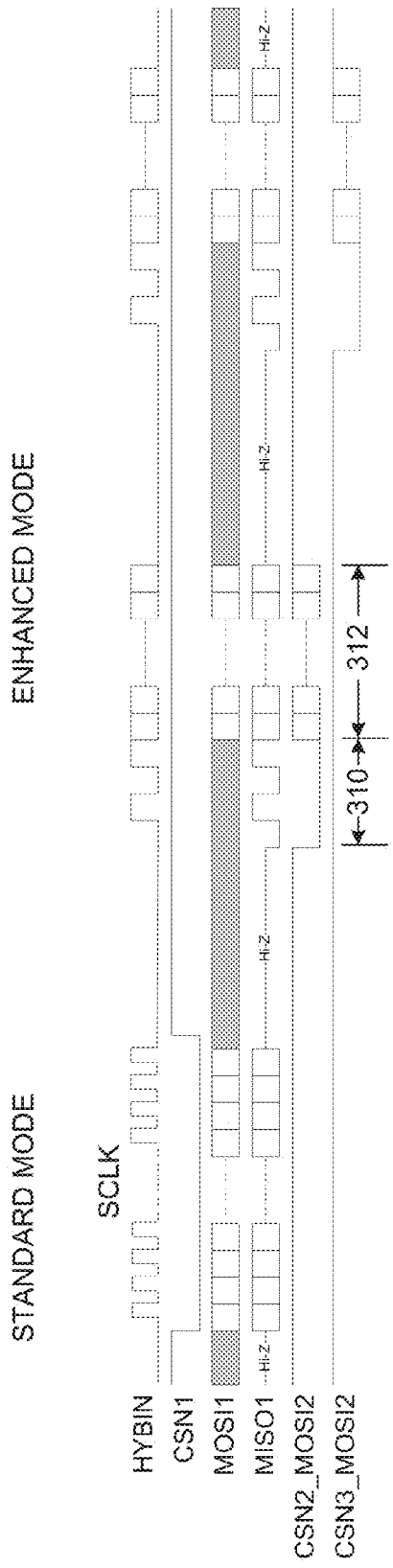
FIG. 3B is a graph depicting an example serial communication using the system in the enhanced mode.

FIG. 3B is a graph 301 depicting an example serial communication using the system 300 including the standard and the enhanced modes. The graph 301 is provided for illustrative purposes and it is appreciated that variations in the signals and signal levels shown are contemplated.

For a first portion, the first standard chip select signal (CSN1) is LOW, which activates the first sensor component $304_1$. The first sensor $304_1$ utilizes the SCLK portion of the hybrid signal (HYBIN) as a clock signal. Additionally, the first sensor $304_1$ sends data by the MISO1 signal and receives data by the MOSI1 signal. The first sensor $304_1$ and the master component 302 operate in the standard mode for the first portion.

For a second portion, the hybrid out/select signal (CSN2_MOSI2) activates the second slave $304_2$ and is used for sending data from the master component 202. The signal includes a pre-amble portion 310 used to select/activate the second slave $304_2$ and a data portion 312 that includes a second master out signal. A second master input signal is also provided after the pre-amble portion 310. Thus, the second slave component $304_2$ and the master component 202 communicate using a first master out signal, a second master out signal, a first master in signal, and a second master in signal.

For a third portion, another hybrid out/select signal (CSN3_MOSI2) activates the third slave $304_3$ and is used for sending data from the master component 202. The signal includes a pre-amble portion used to select/activate the third slave $304_3$ and a data portion that includes a second master out signal. A second master input signal is also provided after the pre-amble portion. Thus, the third slave component $304_3$ and the master component 202 communicate using a first master out signal, a second master out signal, a first master in signal, and a second master in signal.

The system 300 is configured for communication between the master component 302 and one of the slave components 304. However, it is appreciated that suitable variations are contemplated.

Figure 4A:
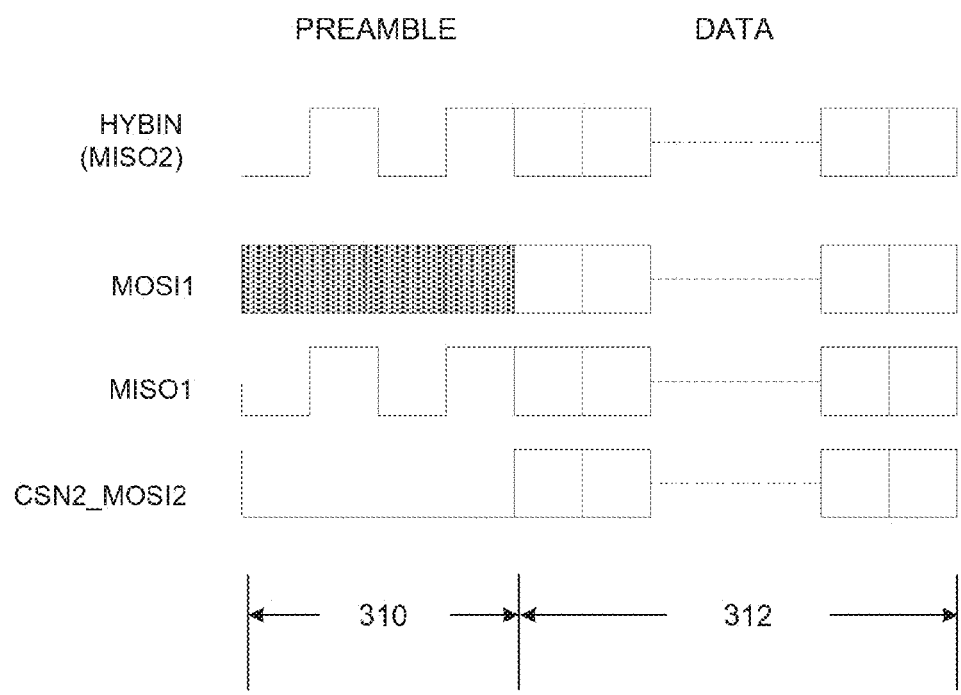
FIG. 4A is a diagram illustrating preamble and data portions of signals used in an enhanced mode.

FIG. 4A is a diagram 450 illustrating preamble and data portions of signals used in an enhanced mode. The signals and portions are provided as examples to illustrate a suitable technique to perform chip selection and data recovery. It is appreciated that variations are contemplated.

The diagram depicts a MISO2 signal (at a hybrid bidirectional terminal of the master component), a MOSI1 signal, a MISO1 signal, and a CSN2_MOSI2 signal. Generally, selection of the slave component and clock and data recover are performed during the preamble portion 310. Dual and full duplex communication occur during the data portion 312.

In this example, the preamble portion 310 is set at four (4) bits. However, it is appreciated that other suitable numbers of bits can be utilized.

The CSN2_MOSI2 signal is held LOW during the preamble portion 310 in order to select the appropriate or desired slave component. The CSN2_MOSI2 signal is typically provided between a dedicated line between the slave component and the master component. The MOSI1 signal is at "don't care" values during the preamble portion.

The MISO1 and MISO2 signals toggle between upper and lower values during the preamble portion 310. These signals are essentially clock signals from the selected slave component. The master component uses a clock and data recovery component to derive or recover a clock from these signals. It is noted that the slave components are not required to perform clock recovery. The master component recovers the clock using the MISO1 and/or the MISO2 signals during the preamble portion.

As a result, the master component has a recovered clock and the appropriate slave component is selected by the end of the preamble portion 310.

The data portion 312 includes a number of data bits corresponding to the frame length. In one example, the data portion includes 28 bits. The recovered clock, which is also the slave component's clock, is used to transfer data. All four signals are used, two master out signals and two master in signals, to communicate with the selected slave component using dual, full duplex communication.

Figure 4B:
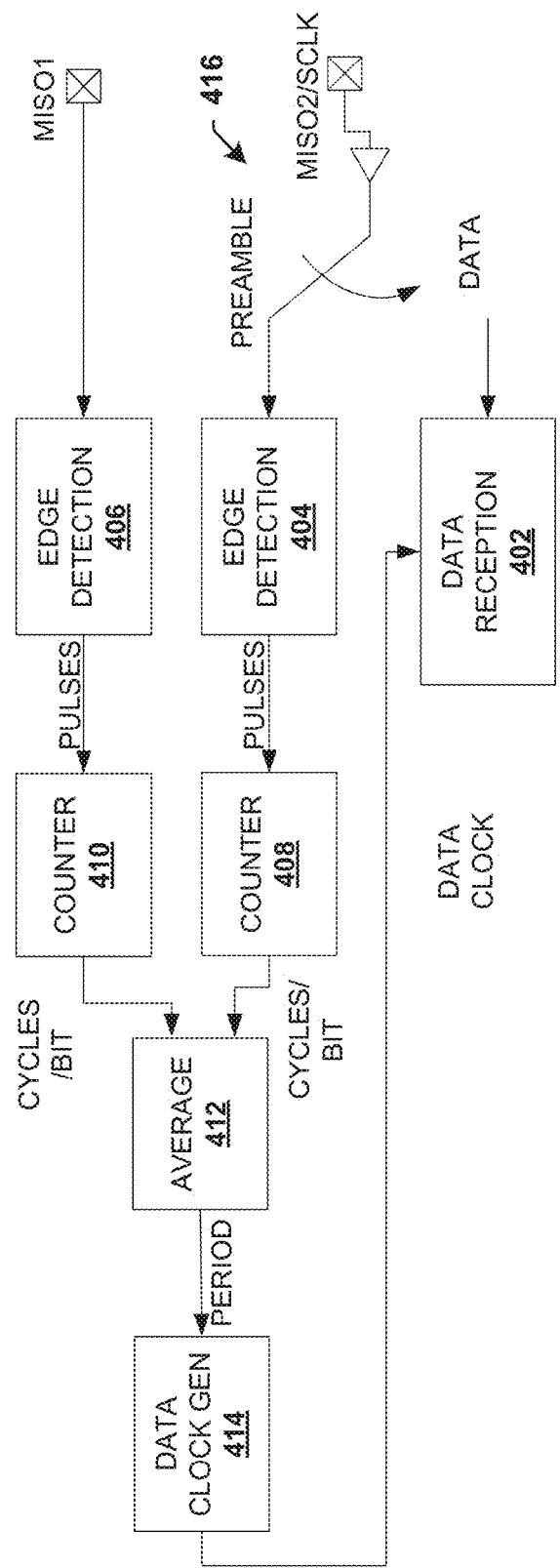
FIG. 4B is a block diagram illustrating an example of a suitable edge detection and clock recovery component.

FIG. 4B is a block diagram illustrating an edge detection and clock recovery component 400 using input signals to a master component. The component 400 can be utilized by the master components described above, such as master component 102. The component 400 is provided as an example of clock and data recovery and is described in the context of the enhanced mode of operation. It is appreciated that other clock and data recover (CDR) techniques and/or components can be utilized.

The component 400 operates in or for a master component, such as those described above. The component receives a first input signal shown as MISO1 in FIG. 4. The component 400 also receives a second input signal, shown as MISO2/SCLK. The first and second input signals are sent from an activated slave component.

The first input signal is received by a first edge detection component 406. The component 406 detects edges of the signal and generates a pulse for each detected edge. A first counter 410 maintains a first count based on the number of pulses from the first edge detection component 406. The counter provides the count as cycles/bit to an averaging component 412.

The second input signal is received by a second edge detection component 404. The second input signal first includes a preamble portion in this example. The preamble portion can be, for example, alternating HIGH and LOW cycles. The second edge detection component 404 detects edges of the preamble portion and generates pulses in response. A second counter 408 counts and maintains a count based on the number of pulses received from the second edge detection component 404. The counter provides the count as cycles/bit to the averaging component 412.

The average component 412 determines a period based on the cycles/bit from the first counter 410 and the second counter 408. The period is used by a data clock generator 414 to generate a data clock. The data clock is then used by a data reception component 402 to obtain data from a data portion of the second input signal. A switch 416 transfers the second input signal from the second edge detection component 404 to the data reception component 402 after the preamble portion of the signal has passed.

The data clock is also used by a second data reception component (not shown) to obtain data from the first input signal.

It is appreciated that the component 400 can also be utilized by slave components to perform clock and data recovery. Output signals from the master component are utilized.

Figure 5:
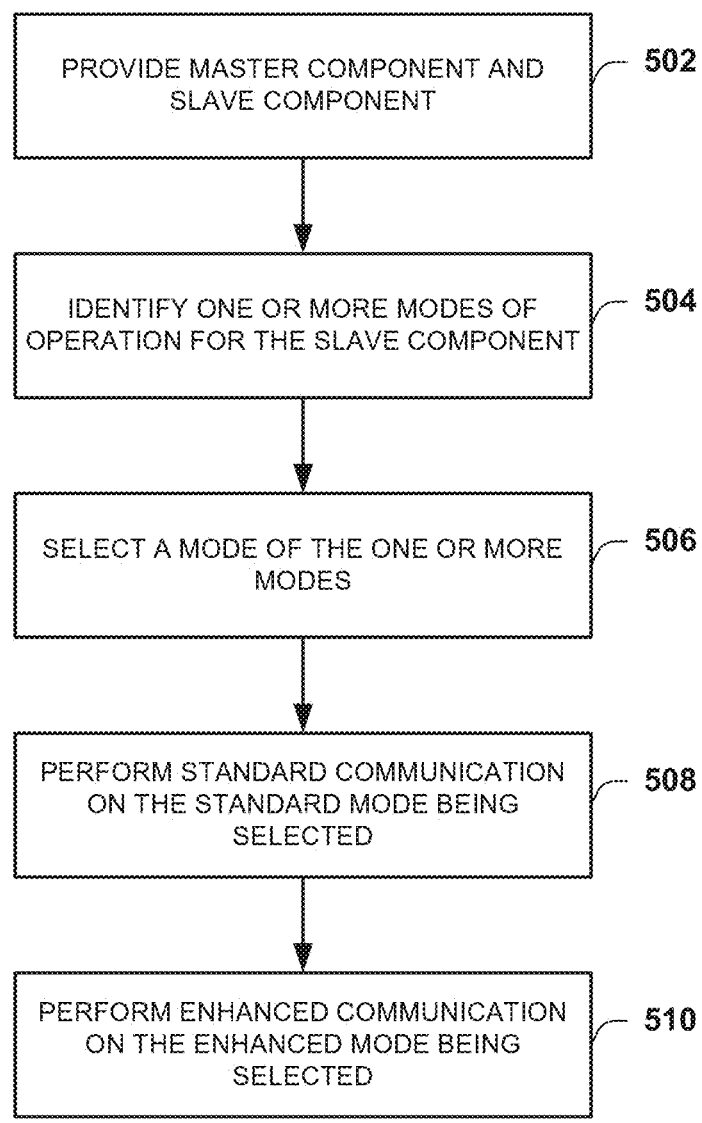
FIG. 5 is a flow diagram illustrating a method of operating an enhanced serial interface system having higher throughput than other serial communication systems.

FIG. 5 is a flow diagram illustrating a method 500 of operating an enhanced serial interface system having higher throughput than other serial communication systems.

The method 500 begins at block 502, wherein a master component and a slave component are provided. The slave component is one of a plurality of slave components, such as described above. The slave component can be sensor, controller, and the like. The master component is also described above. The master component can be a system controller, such as an electric control unit, and the like. The master component and the slave component have a need to communicate or transfer data.

One or more modes of the slave component are identified at block 504. In one example, the slave component includes a standard and enhanced mode. In another example, the slave component only includes the standard mode. In another example, the identified mode is limited to the enhanced mode.

A mode of the one or more modes is selected at block 506. This is typically the standard mode of communication or the enhanced mode of communication. The selection can be based on a variety of factors, such as desired throughput, data reliability, frame length, power usage, and the like.

If the selected mode is the standard mode, standard communication is performed between the master component and the slave component at block 508. The standard communication utilizes a clock generated by the master component, a master input signal, a master output signal, and a chip select signal. Associated terminals and lines for the signals are utilized, as described above.

If the selected mode is the enhanced mode, enhanced communication is performed between the master component and the slave component at block 510. The enhanced communication uses a preamble portion and a data portion. Clock and data recovery are performed at the master component during the preamble portion. Also, the master component asserts an appropriate chip select line during the preamble portion. During the data portion, first and second master input signals and first and second master output signals are utilized between the master component and the selected slave component to implement dual, full duplex communication.

It is appreciated that the above methods and variations thereof can be combined and utilized interchangeably.

While the above methods are is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of system that may be used to implement methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

An enhanced serial interface system is disclosed. The system includes a master component and a slave component. The master component is configured to operate in a standard mode and an enhanced mode for communication. The master component includes standard terminals and hybrid terminals. Only the standard terminals are used for communicating in the standard mode. The hybrid terminals and the standard terminals are used for communicating in the enhanced mode. The slave component is configured to operate in the enhanced mode and communicate with the master component.

A master component system for an enhanced serial interface is disclosed. The system includes a first input terminal, a first output terminal, a second input terminal, and a second output terminal. The first input terminal is configured to receive a first input signal. The first output terminal is configured to provide a first output signal. The second input terminal is configured to provide a clock signal in a standard mode and to receive a second input signal in an enhanced mode. The second output terminal is configured to assert a chip select signal in the standard mode and to provide a second output signal in the enhanced mode.

A method of operating an enhanced serial interface is disclosed. One mode of a standard mode and an enhanced mode is selected. A clock signal and a chip select signal are provided using hybrid terminals on the selected mode being the standard mode. Standard terminals and hybrid terminals are used for communicating on the selected mode being the enhanced mode.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An enhanced serial interface system comprising:
   a master component configured to operate in a standard mode and an enhanced mode for serial communication, the master component including standard terminals and hybrid terminals, and utilizing only the standard terminals for communicating in the standard mode and using the hybrid terminals and the standard terminals for communicating in the enhanced mode; and
   wherein the master component is configured to generate and provide a synchronous clock and a standard chip select signal via the hybrid terminals in the standard mode and to generate a recovered clock from a received input signal and to generate and provide a hybrid select signal via the hybrid terminals in the enhanced mode.

2. The system of claim 1, further comprising a slave component coupled to the master component and configured to perform full duplex serial communications with the master component using the synchronous clock in the standard mode and perform full duplex serial communications with the master component using the recovered clock in the enhanced mode.

3. The system of claim 1, wherein the standard terminals include a first input and a first output and the hybrid terminals include a hybrid output terminal and a hybrid bidirectional terminal.

4. The system of claim 1, wherein the master component further includes a clock and data recover component configured to generate the recovered clock signal from the received input signal and the recovered clock is used for full duplex communication.

5. The system of claim 1, further comprising a plurality of slave components, wherein at least one of the slave components is configured to operate in the standard mode.

6. The system of claim 1, further comprising a plurality of slave components, wherein at least one of the slave components is configured to perform serial communications using the recovered clock and at least one other of the slave components is configured to perform serial communications using the synchronous clock.

7. The system of claim 2, wherein the slave component is configured to receive a first master output signal and a second master output signal in the enhanced mode.

8. The system of claim 3, wherein the hybrid bidirectional terminal is configured to provide the synchronous clock in the standard mode and to receive the received input signal in the enhanced mode.

9. The system of claim 3, wherein the hybrid output is configured to provide the standard chip select signal in the standard mode and to provide the hybrid select signal in the enhanced mode.

10. The system of claim 4, wherein the clock and data recovery component is configured to perform clock recovery on a plurality of input signals, wherein the plurality of input signals includes the received input signal.

11. The system of claim 9, wherein the hybrid select signal includes a preamble portion followed by a data portion.

12. The system of claim 11, wherein the preamble portion selects a slave component.

13. A master component system for an enhanced serial interface, the system comprising:
    a first input terminal of a master component, the first input terminal configured to receive a first input signal;
    a first output terminal of the master component, the first output terminal configured to provide a first output signal;
    a hybrid input terminal of the master component, the hybrid input terminal configured to provide a clock signal in a standard mode and to receive a second input signal in an enhanced mode;
    a hybrid output terminal of the master component, the hybrid output terminal configured to assert a standard chip select signal in the standard mode and to provide a second output signal in the enhanced mode;
    a clock and data recovery component configured to generate a recovered clock from the second input signal in the enhanced mode; and
    wherein the master component is configured to perform full duplex serial communication using the clock signal in the standard mode and to perform enhanced full duplex serial communication using the recovered clock in the enhanced mode.

14. The system of claim 13, wherein the second output terminal is associated with a first slave component.

15. The system of claim 13, wherein the clock and data recovery component is configured to perform clock recovery during a preamble portion of the enhanced mode.

16. The system of claim 13, further comprising a switch coupled to the second input signal and configured to couple the clock signal to the second input terminal in the standard mode and to couple a data input to the second input terminal in the enhanced mode.

17. The system of claim 14, further comprising a third output terminal associated with a second slave component and configured to assert a second standard chip select signal in the standard mode.

18. A method of operating an enhanced serial interface, the method comprising:
    selecting one mode of a standard mode and an enhanced mode;
    on the selected mode being the standard mode, providing a clock signal and a chip select signal using hybrid terminals and performing full duplex serial communication using standard terminals and the provided clock signal; and
    on the selected mode being the enhanced mode, using standard terminals and the hybrid terminals for enhanced full duplex serial communication with a recovered clock, and generating the recovered clock from a received input signal.

19. The method of claim 18, further comprising communicating with a slave component using the standard mode prior to selecting the enhanced mode.

20. The method of claim 18, further comprising identifying an enhanced slave component operable in the enhanced mode, wherein the enhanced slave component omits a terminal for receiving a clock.

* * * * *